No. 707,144. Patented Aug. 19, 1902.
B. F. MAYO.
HEEL NAILING MACHINE.
(Application filed Aug. 16, 1897.)
(No Model.) 2 Sheets—Sheet 1.
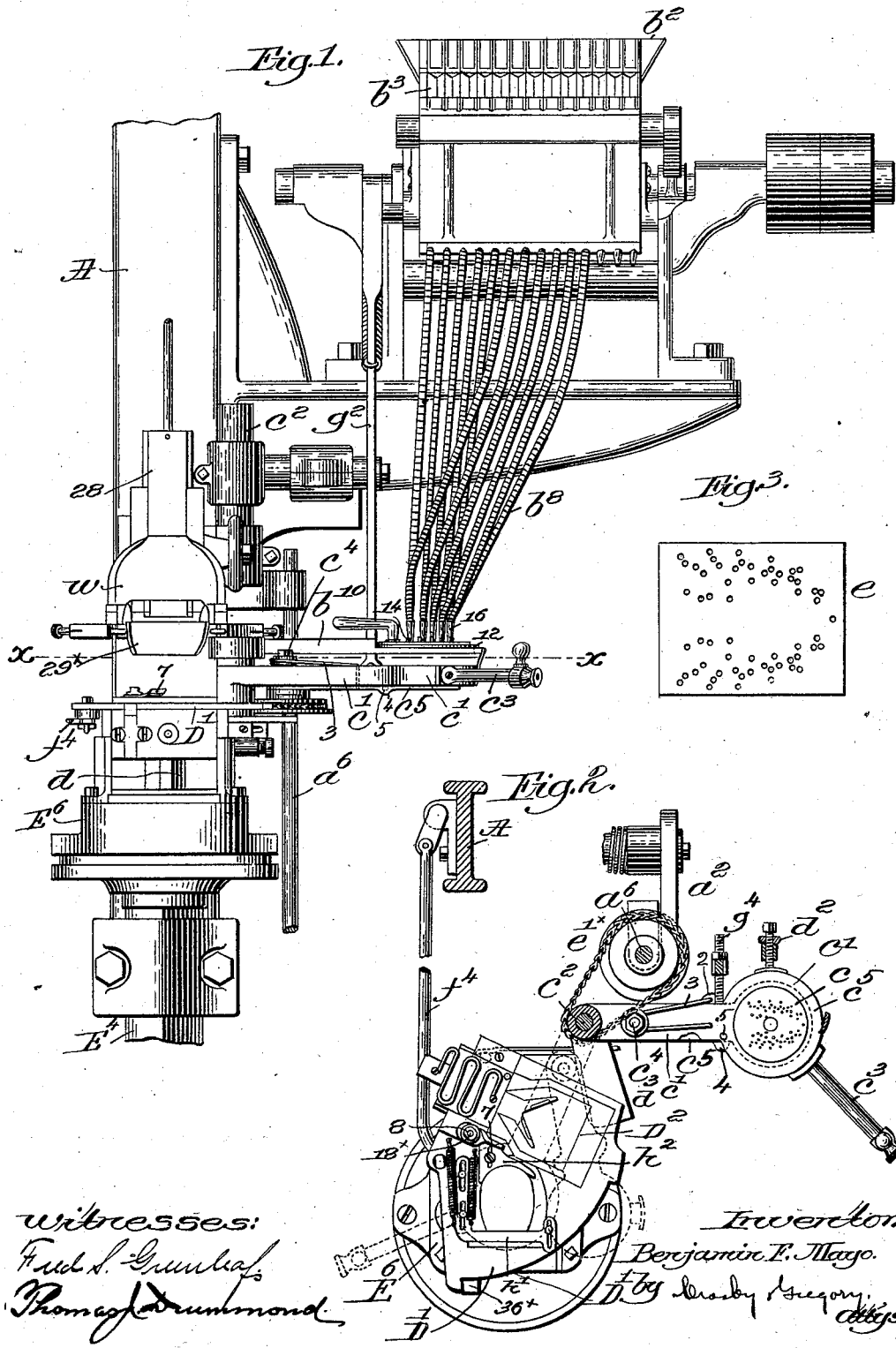

No. 707,144. Patented Aug. 19, 1902.
B. F. MAYO.
HEEL NAILING MACHINE.
(Application filed Aug. 16, 1897.)
(No Model.) 2 Sheets—Sheet 2.
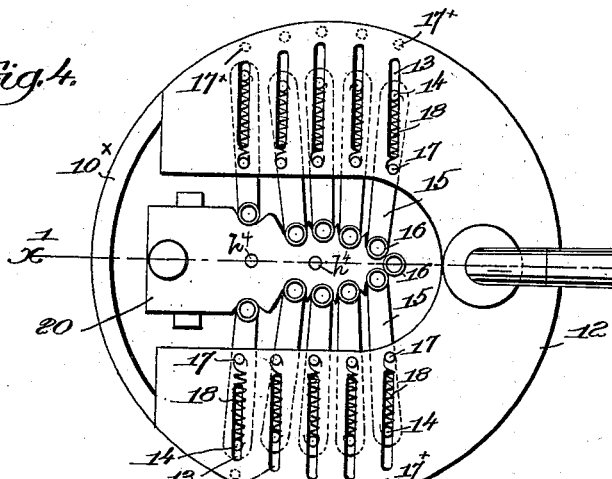
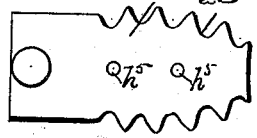
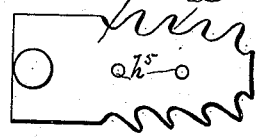
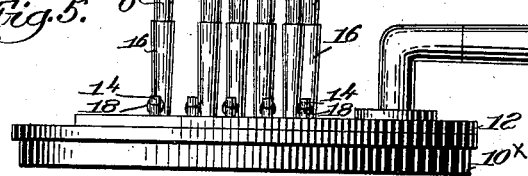
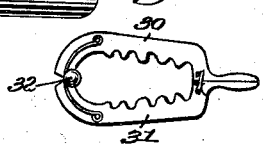
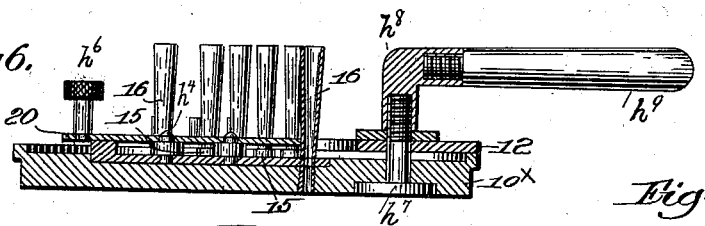
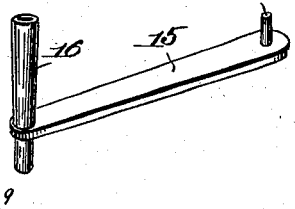
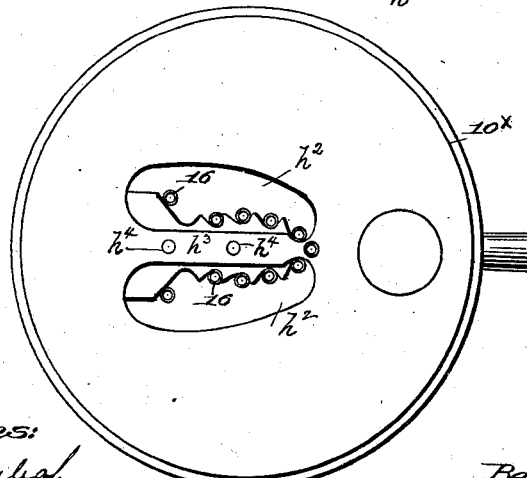
Witnesses:
Fred S. Greenleaf
Thomas J. Drummond
Inventor:
Benjamin F. Mayo
by Crosby & Gregory
attys.
THE NORRIS PETERS CO., PHOTO-LITHO., WASHINGTON, D. C.

UNITED STATES PATENT OFFICE.

BENJAMIN F. MAYO, OF SALEM, MASSACHUSETTS, ASSIGNOR, BY MESNE ASSIGNMENTS, TO THE UNITED SHOE MACHINERY COMPANY, A CORPORATION OF NEW JERSEY.

HEEL-NAILING MACHINE.

SPECIFICATION forming part of Letters Patent No. 707,144, dated August 19, 1902.

Application filed August 16, 1897. Serial No. 648,393. (No model.)

*To all whom it may concern:*

Be it known that I, BENJAMIN F. MAYO, of Salem, county of Essex, State of Massachusetts, have invented an Improvement in Heel-Nailing Machines, of which the following description, in connection with the accompanying drawings, is a specification, like characters on the drawings representing like parts.

In another application, Serial No. 625,873, filed by me on the 5th day of March, 1897, I have shown and described an apparatus for nailing heels and top lifts upon soles, the said apparatus containing devices by which to automatically supply nails into a foot-plate to be transferred therefrom into a nail-carrier, but in said apparatus the foot-plate had to be changed for every particular change in shape of the "nailing" or for different sizes or shapes of heels. This invention aims to improve the apparatus shown in said application in such manner that a change in the nailing or in the shape in which the driven nails shall stand in the heel or for change in size or shape of heels may be made instantly and without changing the foot-plate. To do this, instead of the foot-plate described in said application I have devised a foot-plate comprising a bottom plate and a top plate, and with said foot-plate I employ a series of movable nail-deliveries, each having a suitable nail passage or tube, the number of said deliveries employed depending upon the number of nails to be driven into a heel. These deliveries are independent of each other and are movable independently with relation to the line of nailing. To control and determine the position of these independent nail-deliveries, I employ a pattern, herein represented as a plate, shaped to accord with the nailing desired, said pattern acting, preferably, against the nail-deliveries to control their position. The pattern will preferably be notched at its edges, and when inserted between the deliveries the notches will receive a part of each delivery and retain them spread in the position desired. I have provided means to guide the pattern when being put into its operative position. The deliveries are held yieldingly by suitable springs, which act normally to press the deliveries toward the pattern. Each nail-delivery is connected with a flexible tube that is in turn connected at its opposite end with suitable nail-assorting mechanism.

Figure 1 of the drawings represents in front elevation a sufficient portion of a heel-nailing machine, which, taken in connection with the machine described in said application, will enable my present invention to be thoroughly understood. Fig. 2 is a partial plan view in section below the dotted line $x$ with the shoe-holder omitted. Fig. 3 is a plan view, enlarged, of a nail-block with a series of holes indicating a great variety of nailings which may be done with the same block. Fig. 4 is a top or plan view, much enlarged, showing a series of deliveries with a pattern of one form to control their position. Fig. 5 is a side elevation of Fig. 4, said figure also showing portions of the ends of the flexible tubes that lead the nails from the nail-assorting mechanism into said nail-deliveries. Fig. 6 is a sectional detail through the line $x'$, Fig. 4. Fig. 7 is an under side view of Fig. 4. Figs. 8 and 9 show different forms of patterns for different nailings. Fig. 10 shows one of the gates detached, and Fig. 11 a modified form of pattern.

In the drawings the framework A, the die-bed spindle $E^4$, the hopper $b^2$, the raceways $b^3$, the tubes $b^8$, the means for assorting the nails which slide down the said raceways into the said tubes, the arm $b^{10}$, the nail-carrier $c$, its arm $c'$, having a hub which is mounted loosely on a stationary stud $c^2$; the hand-piece $c^3$, attached to said carrier; the gate $c^5$, shown partially by dotted lines, said gate being pivotally mounted at $c^4$ on the said arm $c'$ and having a finger 4; the spring 3, connected at one end to arm $c'$ and at its other end to a projection 2 of the gate $c^5$, said spring acting normally when permitted to swing the gate about the said pivot $c^4$ to uncover the holes in the nail-carrier and let the nails therein descend therefrom into the nail-block $e$; the pin 5 in the arm $c'$, entering a hole in the finger 4 and holding the gate $c^5$ in position to support the nails in the nail-carrier; the stop 7, (see Fig. 1,) against which said finger 4 strikes and is depressed to effect the release of the gate $c^5$, so that the spring 3 may turn said gate about said pivot $c^4$ to the right, as shown by dotted lines in Fig. 2, so that the nails in the nail-carrier and resting on said gate may readily drop into the usual holes in the nail-block and onto the upper ends of the usual drivers $d$; the heel-holder $D'$; the stud $18^\times$ on which it turns; the top-lift holder $D^2$, the breast-gage $H'$ for the breast of the heel back-part gage $h^2$, the link $f^4$, the cam $d^3$ for moving the heel-holder $D'$ at the proper times, the chain $e'^\times$, the arm $a^2$, the shaft $a^6$, the lever $g^2$, the yoke-like clamp $29^\times$; forked arm $w$, carrying said clamp; the vertically-movable slide 28, the nail-block bed $E^6$ and the screw $g^4$ to stop the arm $c'$ in its normal or loading position, and the adjustable stop $d^2$ to meet and effect the closing of the gate $c^5$, are and may be all substantially as shown and described by like letters in the application hereinbefore referred to. So said devices need not be herein more fully described.

The novel devices illustrating the invention to be herein described and claimed, they having for their object the ready delivery of nails into any of the numerous holes in the usual nail-block, are applicable to the foot-plate shown in said application, they taking the place of the means contained in the foot-plate in said application to receive the nails from the tubes.

My invention provides for readily distributing the nails for any line of nailing.

In order that this invention may be fully available, the holes in the nail-receiving portion of the nail-carrier $c$ (see Fig. 2) and in the nail-block $e$, (see Fig. 3,) shown therein on a much larger scale, will or may be distributed substantially as indicated by the great number of holes therein, the nail-holes of the nail-carrier and nail-block of course coinciding.

I have devised what I shall call a "system of movable nail-deliveries," which receive the nails from the flexible tubes $b^8$, said deliveries being freely movable, and when in operation being controlled as to their positions by a suitable pattern, so that nails entering said deliveries may drop therefrom into any of the numerous holes referred to, the carrier $c$ being so made and located as to adapt one and the same nail carrier and block for use with heels of varying size and shape. This nail-block, with the great number of holes arranged substantially as represented, is not herein claimed as novel.

Referring now to my invention, Fig. 4 represents a foot-plate which will be mounted upon or set into the curb at the outer end of the arm $b^{10}$, common to said application, instead of the foot-plate therein shown. The foot-plate as herein represented is composed of a bottom plate $10^\times$ and a top plate 12, sustained above it, the top plate resembling somewhat in shape a horseshoe and having a series of slots 13. The drawings show a series of levers 15 occupying positions between said plates, each lever having at its inner end a nail passage or tube 16, constituting the essential part of what I have herein designated as a "nail-delivery." The outer ends of the levers 15 have pins 14, that enter the slots 13, and said pins have connected with them one end of a spring, as 18, the opposite ends of said spring engaging pins 17, mounted, as shown, in the plate 12, said series of springs, one for each nail-delivery, acting to press the nail-deliveries normally to the center of the plate $10^\times$. (Indicated by line $x'$ in Fig. 4.) The bottom plate $10^\times$ (see Fig. 7) has an enlarged throat $h^2$, shown as two open spaces, with a tongue $h^3$ between, that sustains two pins or guides $h^4$, said guides extending upwardly and receiving the holes $h^5$ of the pattern, said pins or guides accurately positioning the pattern. The nail-deliveries in their adjustment may move in any direction in the spaces $h^2$, and in whatever position they are held by the pattern they will be left over suitable holes in the perforated portion of the nail-carrier. The pattern is confined in working position after it has been applied to the guides $h^4$ by means of a screw $h^6$. The bottom and top plates $10^\times$ and 12 are clamped firmly together by means of a stud-screw $h^7$ (see Fig. 6) and a nut $h^8$ (represented as L-shaped,) said nut having a detachable handle $h^9$, the handle being serviceable when it is desired to change one of my improved foot-plates for another one having a greater or less number of nail-deliveries. Each of these nail passages or tubes has inserted into it or connected with its open upper end one of the flexible tubes $b^8$, into which the nails to be driven into the heel are dropped with their heads leading. The springs connected with the deliveries, Fig. 4, tend to move said deliveries toward the pattern. When placing a pattern in working position, it may be introduced between the deliveries and turned and fastened in position, and as the plate is turned into its operative position it will act against the deliveries and push them outwardly. If desired, the tubes may be acted upon by hand and pushed back when putting a pattern-plate in position.

I have provided a series of patterns or plates 20 21 22, each composed, preferably, of steel, having a series of notches, as 23, located irregularly each with relation to the other, the bottoms of said notches at one side of the plate being more or less separated from the bottoms of notches at the other side of the pattern, so that each pattern when used may receive in each one of its notches a delivery and position said deliveries in the desired curve or path with relation to the holes in the nail-carrier, that depending upon the particular shape of the pattern-plate, there being as many different pattern-plates as there are nailings to be made in the heels of the shoes being produced.

In Fig. 4 the pattern-plate 20 positions the funnel-shaped nail-holding portions of the deliveries in one gradual curve; but were the pattern-plates 21 or 22 used they would position the said deliveries in a different curve or line, the springs 18 yielding to allow this change of position of the deliveries.

From the foregoing it will be seen that the nails dropped into the tubes will readily enter the deliveries and that the deliveries, by applying to them, as represented in Fig. 4, a pattern-plate of the desired shape, may be moved one with relation to the other to occupy a position in any desired line, such lines, however, corresponding with one of the series of nailings depicted or provided for by the positions of the holes in the nail-carrier and in the top of the nail-block, as referred to with relation to Fig. 3.

In Fig. 11 the pattern is shown as composed of two plates 30 and 31, which may be pivoted together at 32, each of said plates being suitably notched to engage a delivery, and the deliveries to operate with this class of pattern, it acting to push the deliveries one toward the other, must be acted upon by a spring which will normally pull the deliveries apart or separate them one from the other, and to effect this one end of each of said springs may be connected to a series of pins 14 and to studs $17^\times$, erected on the plate 12 at the opposite ends of the slots in which the pins 14 travel.

Believing myself to be the first to employ a series of easily-movable deliveries under the control of a pattern-plate, so that by the use of one or another plate differing in shape said deliveries may be readily and instantly shifted or changed from one into another position to correspond with any or the desired usual nailing outline, this invention is not to be limited to the exact shape shown for the deliveries, nor to the means for supporting them on or with relation to the plate $10^\times$, for the particular shape of the deliveries and their supporting means may be variously modified and yet be within the scope of my invention.

This invention is useful in any machines where nails are to be driven in other than a straight line.

Having described my invention, what I claim as new, and desire to secure by Letters Patent, is—

1. In a nailing-machine, a series of movable nail-deliveries, means to support said deliveries, and a pattern adapted to coöperate with said deliveries to maintain the latter in position to accord with a desired form or outline of nailing, substantially as described.

2. In a nailing-machine, a series of movable nail-deliveries, means to support said deliveries, a series of nail-guiding tubes connected to and movable with said deliveries to supply nails thereto, and a pattern adapted to coöperate with said deliveries to maintain them in position to accord with a desired form or outline of nailing, substantially as described.

3. A plate, a series of deliveries mounted loosely thereon and springs to normally move said deliveries in one direction, combined with a pattern plate or device adapted to be applied to said deliveries to place them at proper distances apart and maintain them in the position designated by the contour of said pattern-plate, said springs operating to maintain the deliveries in contact with the pattern-plate, substantially as described.

4. In a nailing-machine, a series of nail-deliveries to inclose nails, means to support said deliveries, and a pattern to position simultaneously all said deliveries in the desired outline for nailing.

5. In a heeling-machine, a foot-plate, nail-assorting mechanism, a series of independent movable nail-deliveries, a series of flexible tubes connected each with one of said nail-deliveries and with said nail-assorting mechanism, and a pattern to position independently said nail-deliveries according to the arrangement of holes to be filled with nails and the outline of nailing desired.

6. In a nailing-machine, a series of spring-held nail-deliveries, and a pattern-plate adapted to act simultaneously on and position each delivery independently.

7. In a nailing-machine, a series of pivoted, slidable, normally-yielding nail-deliveries, and a pattern-plate to simultaneously insure the placing of said nail-deliveries in position to enable nails to be arranged in accordance with a desired outline.

8. In a nailing-machine, a plate, a series of nail-tubes and arms sustaining them, a slot-and-pin connection between said plate and arms, and a pattern-plate acting against said nail-tubes to position them and their arms in accordance with the outline of nailing desired.

9. In a nailing-machine, a series of independently-movable nail-deliveries, combined with a pattern having a series of notches to receive and determine the position of said nail-deliveries to accord with a desired outline of nailing.

10. In a nailing-machine, a foot-plate comprising a bottom plate having an enlarged throat, a series of independent nail-deliveries adapted to be moved to place their lower ends in different portions of said throat, and a pattern to position said nail-deliveries with relation to said throat.

In testimony whereof I have signed my name to this specification in the presence of two subscribing witnesses.

BENJAMIN F. MAYO.

Witnesses:
GEO. W. GREGORY,
MARGARET A. DUNN.